US010369612B2

(12) United States Patent
Kobayashi et al.

(10) Patent No.: US 10,369,612 B2
(45) Date of Patent: Aug. 6, 2019

(54) METHOD AND SYSTEM FOR PRODUCING RING-SHAPED MEMBER FOR VEHICLE, AND SYNCHRONIZER RING

(71) Applicant: NSK LTD., Tokyo (JP)

(72) Inventors: Kazuto Kobayashi, Fujisawa (JP); Hiroshi Koyama, Fujisawa (JP); Yuu Yasuda, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/748,901

(22) PCT Filed: Dec. 16, 2016

(86) PCT No.: PCT/JP2016/087543
§ 371 (c)(1),
(2) Date: Jan. 30, 2018

(87) PCT Pub. No.: WO2017/104800
PCT Pub. Date: Jun. 22, 2017

(65) Prior Publication Data
US 2018/0214925 A1    Aug. 2, 2018

(30) Foreign Application Priority Data
Dec. 16, 2015 (JP) ................. 2015-245271

(51) Int. Cl.
*B21D 28/00* (2006.01)
*B21D 28/36* (2006.01)
(Continued)

(52) U.S. Cl.
CPC ............. *B21D 28/36* (2013.01); *B21D 28/00* (2013.01); *B21D 28/02* (2013.01); *B21D 28/28* (2013.01);
(Continued)

(58) Field of Classification Search
CPC ........ B21D 28/06; B21D 28/28; B21D 28/36; B21D 53/86; B23D 21/14
See application file for complete search history.

(56) References Cited

U.S. PATENT DOCUMENTS 3,259,003 A * 7/1966 Griffin .................. B21D 28/28
29/557
4,621,553 A * 11/1986 Gruchalski ............ B21D 28/28
83/194

FOREIGN PATENT DOCUMENTS

DE   10 2006 006 024 A1   8/2007
JP        02-070329 A     3/1990
(Continued)

OTHER PUBLICATIONS

International Search Report for PCT/JP2016/087543, dated Mar. 14, 2017.
(Continued)

*Primary Examiner* — Debra M Sullivan
(74) *Attorney, Agent, or Firm* — Sughrue Mion, PLLC

(57) ABSTRACT

A method and a system for producing a ring-shaped member. A punching process is carried out on an axial intermediate part of a first intermediate annular material so as to produce a pair of ring-shaped members. A punching step includes a step in which a first punching process is carried out over a first range of the axial intermediate part in the circumferential direction, and a step in which a second punching process is carried out over a second range of the axially-oriented intermediate part, which is at least partially different than the first range, in the circumferential direction. The first punching process is carried out such that at least one tab is formed. The second punching process is carried out such that at least one separate tab is formed, thereby producing the pair of ring-shaped members.

13 Claims, 10 Drawing Sheets

(51) Int. Cl.
    *B21D 28/28*     (2006.01)
    *B21K 1/30*     (2006.01)
    *F16D 23/06*     (2006.01)
    *B21D 51/16*     (2006.01)
    *F16D 23/02*     (2006.01)
    *B21D 28/02*     (2006.01)
    *B21D 53/16*     (2006.01)
    *B21D 53/84*     (2006.01)

(52) U.S. Cl.
    CPC .............. *B21D 51/16* (2013.01); *B21D 53/16* (2013.01); *B21D 53/84* (2013.01); *B21K 1/30* (2013.01); *F16D 23/025* (2013.01); *F16D 23/06* (2013.01); *F16D 2250/0023* (2013.01)

(56) References Cited

FOREIGN PATENT DOCUMENTS

| | | |
|---|---|---|
| JP | 03-297527 A | 12/1991 |
| JP | 04-009238 A | 1/1992 |

OTHER PUBLICATIONS

Communication dated Feb. 5, 2019 from European Patent Office in counterpart EP Application No. 16875774.8.

\* cited by examiner (a)

(b)

Prior Art

Prior Art

Prior Art

Prior Art

METHOD AND SYSTEM FOR PRODUCING RING-SHAPED MEMBER FOR VEHICLE, AND SYNCHRONIZER RING

CROSS REFERENCE TO RELATED APPLICATIONS

This application is a National Stage of International Application No. PCT/JP2016/087543 filed Dec. 16, 2016, claiming priority based on Japanese Patent Application No. 2015-245271 filed Dec. 16, 2015, the contents of all of which are incorporated herein by reference in their entirety.

TECHNICAL FIELD

The present invention relates to a method and a system for manufacturing a ring-shaped member for a vehicle having a claw piece such as a synchronizer ring incorporated in a manual transmission.

Priority is claimed on Japanese Patent Application No. 2015-245271, filed Dec. 16, 2015, the content of which is incorporated herein by reference.

TECHNICAL BACKGROUND

A synchronization mechanism is incorporated in a manual transmission so that a drive shaft rotates in synchronism with a transmission gear at the time of a gear shift operation. A synchronizer ring is incorporated in such a synchronization mechanism. As an example of the synchronization mechanism incorporating such a synchronizer ring 1. In a synchronization mechanism, an insert spring 4 is mounted on an outer circumference of a synchronizing hub 3 which rotates together with a drive shaft 2, and a coupling sleeve 5 displaced in an axial direction on the basis of an operation of a shift lever is engaged with the insert spring 4. An outer balk ring 8, a synchronizer ring 1, and an inner balk ring 9 are provided between the coupling sleeve 5 and a clutch gear 7 which rotates in synchronism with a transmission gear 6.

When the coupling sleeve 5 is pushed to the left in FIG. 8 in accordance with a gear shift operation, first, a rotational speed difference between the coupling sleeve 5 and the clutch gear 7 is eliminated by a frictional force acting between an outer balk ring 8 and the synchronizer ring 1 and between the synchronizer ring 1 and an inner balk ring 9. When the coupling sleeve 5 is further pushed from this state, a spline groove 10 formed on an inner circumferential surface of the coupling sleeve 5 engages with a spline groove 11 formed on an outer circumferential edge of the clutch gear 7 and a spline groove 12 formed on an outer circumferential edge of the insert spring 4 so as to stretch over them, and thus the drive shaft 2 rotates in synchronism with the transmission gear 6.

The synchronizer ring 1 incorporated in the synchronization mechanism configured and operating as described above is configured in a shape, for example, as illustrated in FIGS. 9 and 10. That is, the synchronizer ring 1 is constituted by a tapered cylindrical portion 13 of which a diameter changes in the axial direction, and claw pieces 15 and 15 formed at regular intervals at a plurality of positions on a large diameter side end surface 14 of the tapered cylindrical portion 13. A thickness dimension t of each of the claw pieces 15 and 15 is smaller than a thickness dimension T of the tapered cylindrical portion 13 (T>t). Further, a direction of each of the claw pieces 15 and 15 is different depending on a structure of synchronization mechanisms into which the synchronizer ring 1 is to be incorporated, and may be inclined in the same direction as the tapered cylindrical portion 13, or the claw pieces 15 and 15 may be parallel to each other.

As a method of manufacturing the synchronizer ring 1 having such a shape, a method of manufacturing the synchronizer ring 1 at low cost by subjecting a flat metal plate to press processing is described in Patent Document 1. FIGS. 11 to 15 illustrate a manufacturing method of a synchronizer ring described in Patent Document 1 and conventionally known. First, a first ring-shaped workpiece 16 as illustrated in FIGS. 12 and 13 is formed by so-called blanking which punches out a flat metal plate such as carburized steel such as SCr420. The first ring-shaped workpiece 16 includes an annular main body portion 17 and tongue-shaped portions 18 and 18 protruding from a plurality of positions on an outer circumferential edge of the main body portion 17. Next, a second ring-shaped workpiece 19 as illustrated in FIGS. 14 and 15 is formed by press-molding the first ring-shaped workpiece 16. That is, in the molding step, the main body portion 17 (FIGS. 12 and 13) is formed into a tapered cylindrical portion 20 inclined in a direction in which a diameter thereof decreases with distance away from the tongue-shaped portions 18 and 18 so that the second ring-shaped workpiece 19 is formed. Next, an end surface of the tapered cylindrical portion 20 and each of the tongue-shaped portions 18 and 18 which constitute the second ring-shaped workpiece 19 are subjected to machining such as turning so that the tapered cylindrical portion 20 and each of the tongue-shaped portions 18 and 18 have predetermined shapes and dimensions. Next, after burrs generated on the basis of the machining are removed, heat treatment is performed to obtain a desired hardness. In the heat treatment, for example, a carburizing heat treatment is performed, and thereafter, deformation based on heat treatment is corrected. A third ring-shaped workpiece on which such a heat treatment is performed as above is subjected to surface grinding for finishing flat surfaces of the respective tongue-shaped portions 18 and 18 to form the respective claw pieces 15 and 15 as well as inner and outer diameter grinding for smoothing both the inner and outer circumferential surfaces of the tapered cylindrical portion 20 to form the tapered cylindrical portion 13 so that the synchronizer ring 1 is formed. Then, the synchronizer ring 1 manufactured in this manner is shipped after performing a predetermined inspection.

Incidentally, in the case of the method of manufacturing the synchronizer ring 1 described in Patent Document 1 as described above, one synchronizer ring 1 is formed from the first ring-shaped workpiece 16 formed by applying a punching process to a flat metal plate. Therefore, there is room for improvement from a manufacturing efficiency perspective.

RELATED ART DOCUMENTS

Patent Document

Patent Document 1
  Japanese Patent Application, Publication No H03-297527

SUMMARY OF INVENTION

Technical Problem

An aspect of the present invention is directed to realizing a method and a system of manufacturing a ring-shaped member capable of improving manufacturing efficiency.

Solution to Problem

A method of manufacturing a ring-shaped member for a vehicle according to one aspect of the present invention includes a punching step of punching out an axial intermediate portion of a ring-shaped workpiece entirely in a circumferential direction so that a first ring-shaped member and a second ring-shaped member each having at least one claw piece are formed, in which the punching step includes a step of performing a first punching process on a first region of the intermediate portion in the circumferential direction, and a step of performing a second punching process on a second region of the intermediate portion which is at least partially different from the first region in the circumferential direction.

A method of manufacturing a ring-shaped member for a vehicle according to another aspect of the present invention includes a punching step of punching out an axial intermediate portion of a ring-shaped workpiece so that a first ring-shaped member and a second ring-shaped member each having at least one claw piece are formed, in which the punching step has a step of performing a first punching process on a first region of the intermediate portion in a circumferential direction, and a step of performing a second punching process on a second region of the intermediate portion which is at least partially different from the first region in the circumferential direction, and the method further includes a step of forming a concave surface extending in the circumferential direction on an inner circumference of the intermediate portion before the punching step.

Another aspect of the present invention is a synchronizer ring manufactured using the above-described manufacturing method.

A system of manufacturing a ring-shaped member for a vehicle according to another aspect of the present invention includes a first device which punches out an axial intermediate portion of a ring-shaped workpiece entirely in the circumferential direction so that a first ring-shaped member and a second ring-shaped member each having at least one claw piece are formed, in which the first device performs a first punching process on a first region of the intermediate portion in the circumferential direction, and a second punching process on a second region of the intermediate portion which is at least partially different from the first region in the circumferential direction.

A system of manufacturing a ring-shaped member for a vehicle according to another aspect of the present invention includes a first device which punches out an axial intermediate portion of a ring-shaped workpiece so that a first ring-shaped member and a second ring-shaped member each having at least one claw piece are formed, the first device performing a first punching process on a first region of the intermediate portion in a circumferential direction and a second punching process on a second region of the intermediate portion which is at least partially different from the first region in the circumferential direction, and a second device which forms a concave surface extending in the circumferential direction on an inner circumference of the intermediate portion before the punching process of the first device.

A method of manufacturing a ring-shaped member according to another aspect of the present invention has a target of a ring-shaped member including a cylindrical portion, and a claw piece formed on an axial end surface of the cylindrical portion in a state of protruding in the axial direction from the axial end surface. Such a manufacturing method includes a step of manufacturing a pair of ring-shaped members in which at least one claw piece protruding in the axial direction from an end surface is provided on the end surface of each punched side by the punching process for punching out the entire circumference of the axial intermediate portion with respect to a first ring-shaped workpiece. In such a punching process, the entire circumference of the axial intermediate portion of the first ring-shaped workpiece can be punched out at once or punched out by punching a plurality of times.

In one example, it is possible to employ a configuration in which the punching process is performed while index-rotating the first ring-shaped workpiece and the punch relatively.

In one example, it is possible to employ a configuration in which there is a step of forming the first ring-shaped workpiece by applying a rolling process for reducing a thickness of a ring-shaped workpiece with respect to the ring-shaped workpiece.

In one example, it is possible to employ a configuration in which the ring-shaped workpiece is formed by forging a material cut out from a solid wire rod. For forging, various methods such as cold forging, hot forging, or warm forging can be employed, for example.

In one example, it is possible to employ a configuration in which an inner circumferential surface and an outer circumferential surface of the first ring-shaped workpiece are inclined in a direction in which an outer diameter and an inner diameter become larger toward the axial center portion.

In one example, it is possible to employ a configuration in which a ring-shaped large-diameter workpiece and a ring-shaped small-diameter workpiece having different outer and inner diameters from each other are formed by forging the workpieces, and each of the ring-shaped large-diameter workpiece and the ring-shaped small-diameter workpiece are used as ring-shaped workpieces.

In one example, it is possible to employ a configuration in which the ring-shaped large-diameter workpiece and the ring-shaped small-diameter workpiece have the same volume.

In one example, it is possible to employ a configuration in which a first ring-shaped workpiece formed by applying a rolling process to a ring-shaped workpiece formed from the ring-shaped large-diameter workpiece and a first ring-shaped workpiece formed by applying a rolling process to a ring-shaped workpiece formed from the ring-shaped small-diameter workpiece have the same dimensions.

In one example, it is possible to employ a configuration in which the workpiece is one cut out from a hollow wire rod.

Advantageous Effects of Invention

According to aspects of the present invention, it is possible to improve manufacturing efficiency of the ring-shaped member for a vehicle. For example, a pair of ring-shaped members can be formed from a first ring-shaped workpiece. Therefore, manufacturing efficiency can be improved compared to a manufacturing method in which one ring-shaped member is formed from one ring-shaped workpiece.

DESCRIPTION OF EMBODIMENTS

First Example of an Embodiment

Figure 8:
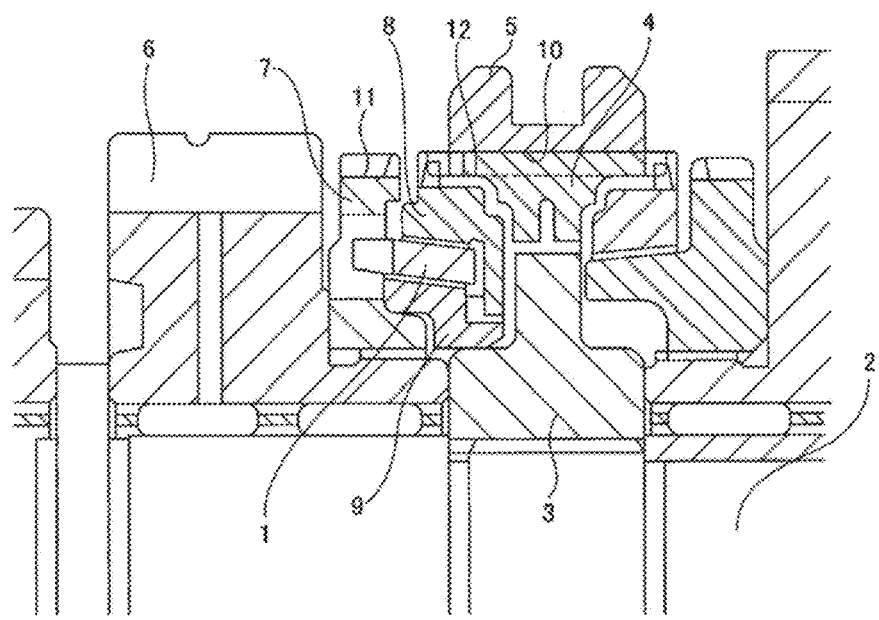
FIG. 8 is a partial cross-sectional view illustrating an example of a synchronization mechanism incorporating a synchronizer ring, which is one type of steel ring-shaped member.
Figure 9:
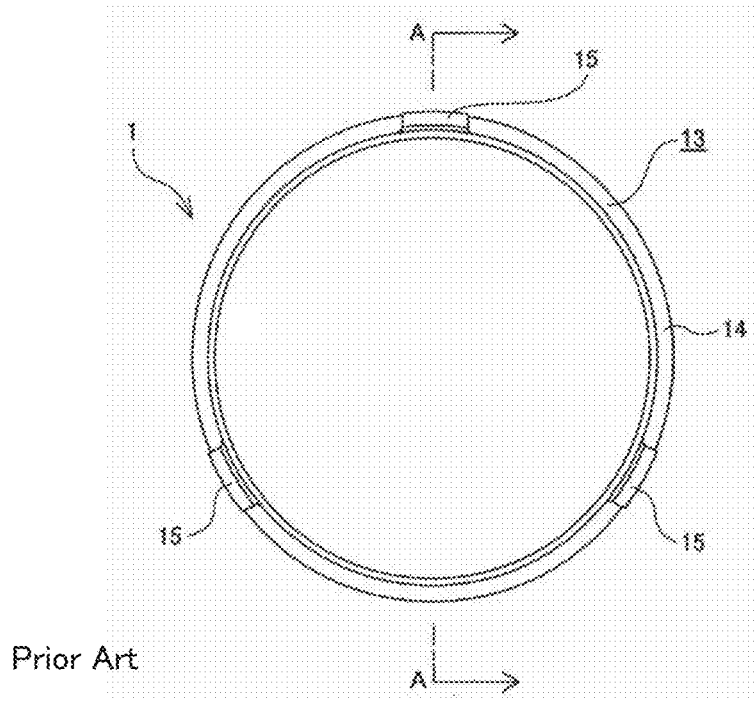
FIG. 9 is an end surface view illustrating an example of a synchronizer ring.
Figure 10:
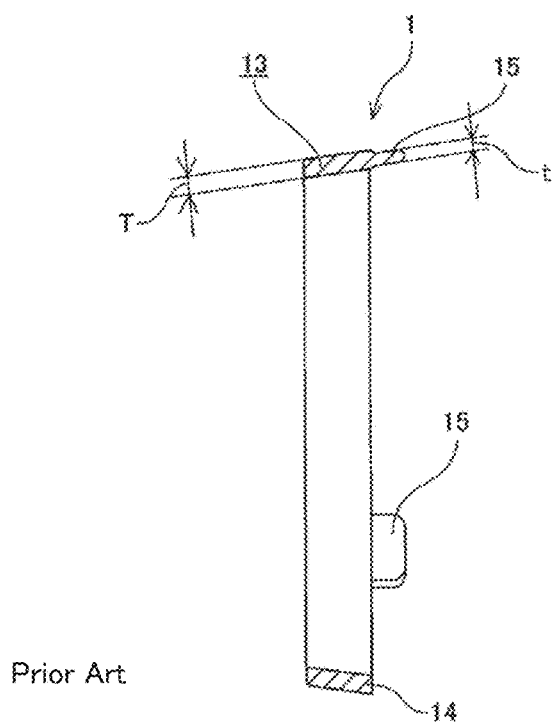
FIG. 10 is a cross-sectional view taken along line A-A of FIG. 9.
Figure 11:
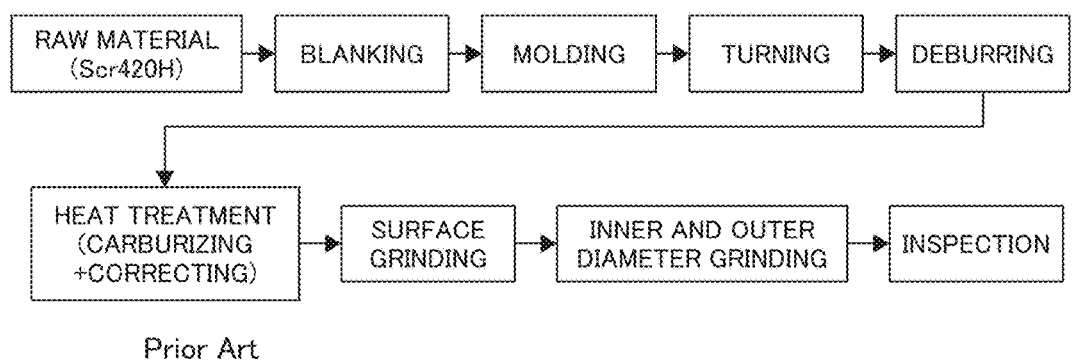
FIG. 11 is a flowchart illustrating an example of a conventional method.
Figure 12:
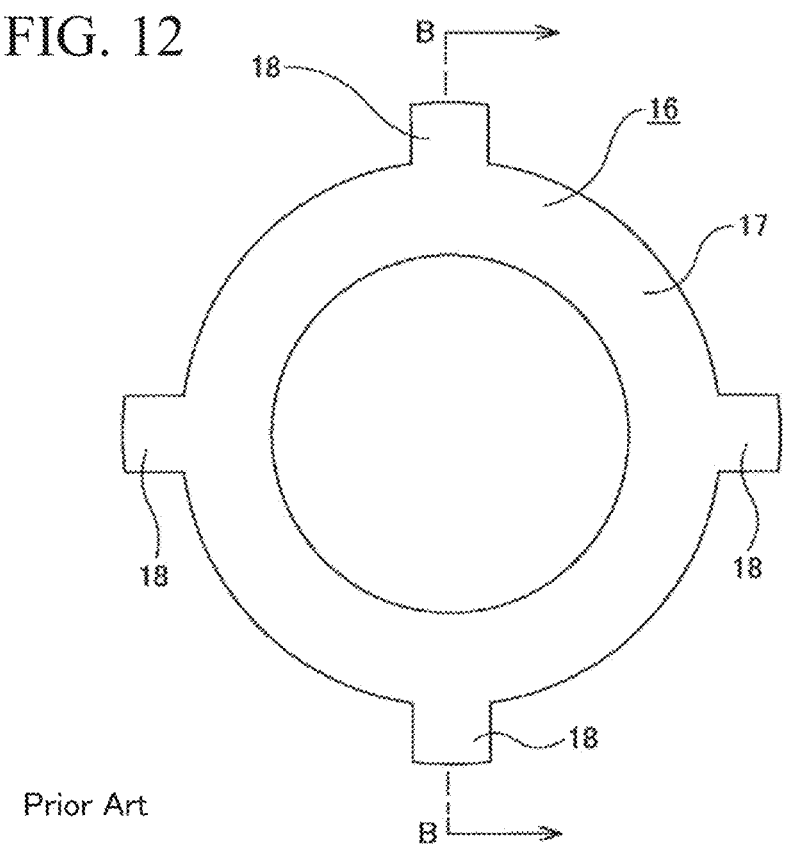
FIG. 12 is an end surface view of a first workpiece.
Figure 13:
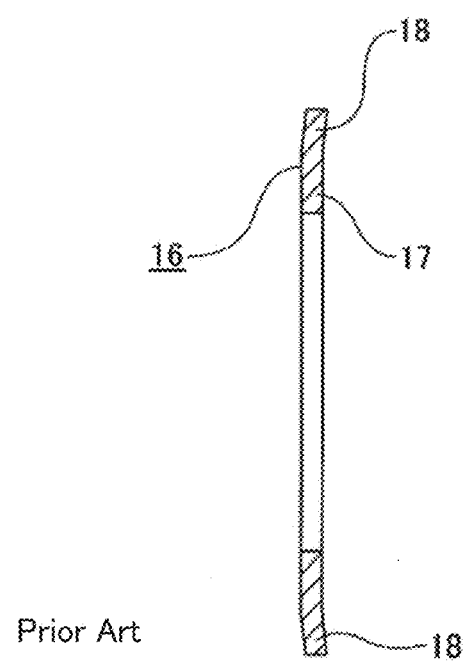
FIG. 13 is a cross-sectional view taken along line B-B of FIG. 12.
Figure 14:
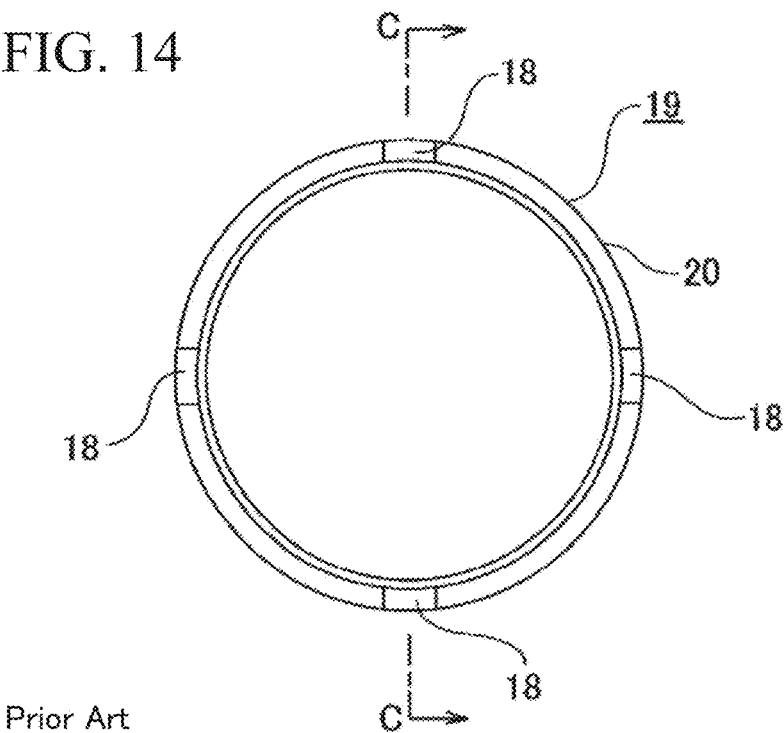
FIG. 14 is an end surface view of a second workpiece.
Figure 15:
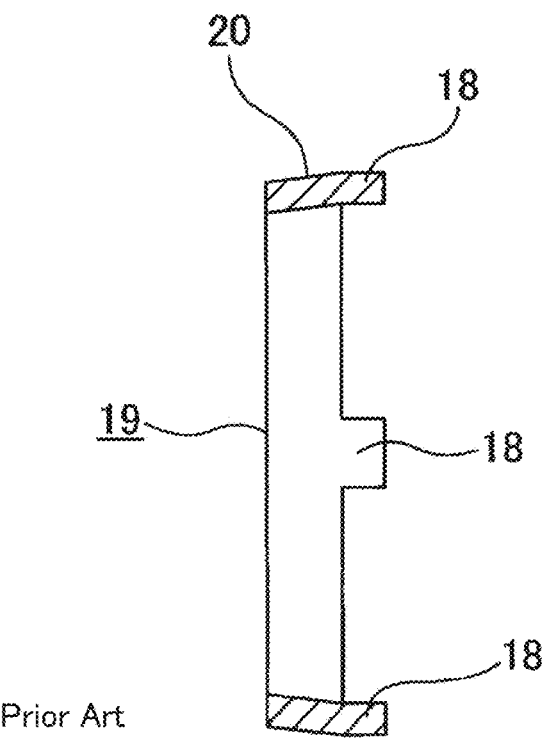
FIG. 15 is a cross-sectional view taken along line C-C of FIG. 14.

A first example of an embodiment of the present invention will be described with reference to FIGS. 1 to 3. In this example, a method of manufacturing a ring-shaped member of the present invention is applied to a synchronizer ring. Further, the synchronizer ring which is an object of the manufacturing method of the present example can be applied not only to a synchronization mechanism illustrated in FIG. 8 but also to various synchronization mechanisms appropriately. Description of a structure of the synchronization mechanism will be omitted. Hereinafter, after describing the structure of the synchronizer ring which is an object of the manufacturing method of the present example, the method of manufacturing the ring-shaped member of the present example will be described.

Figure 1:
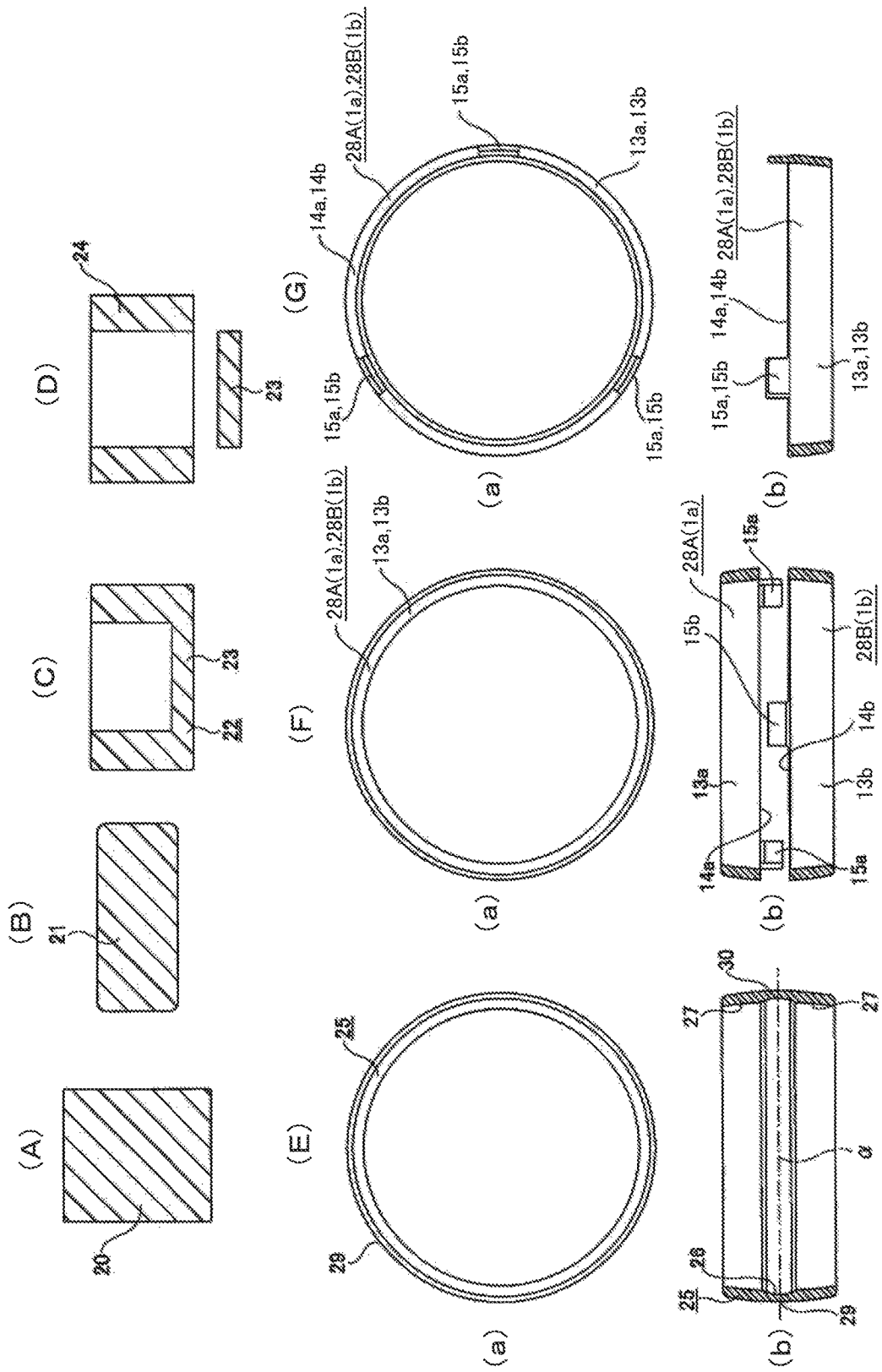
FIG. 1 is a view illustrating a first example of an embodiment of the present invention for describing steps of a method of manufacturing a ring-shaped member.
Figure 2:
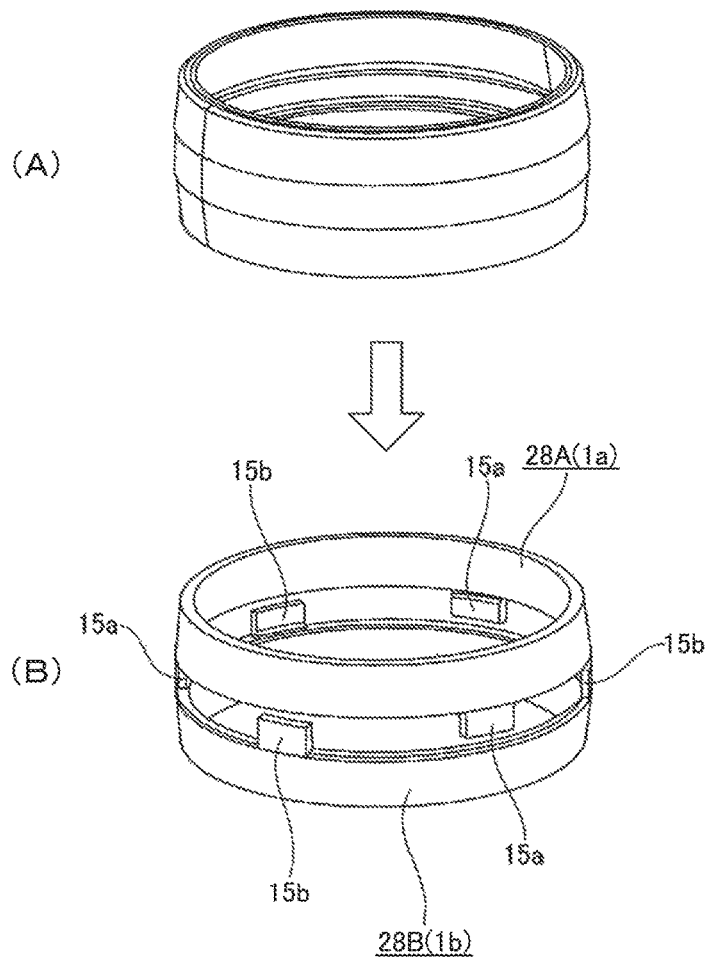
FIG. 2 includes a perspective view (A) of a first ring-shaped workpiece illustrated in FIG. 1(E) and a perspective view (B) of a pair of ring-shaped members illustrated in FIG. 1(F).
Figure 3:
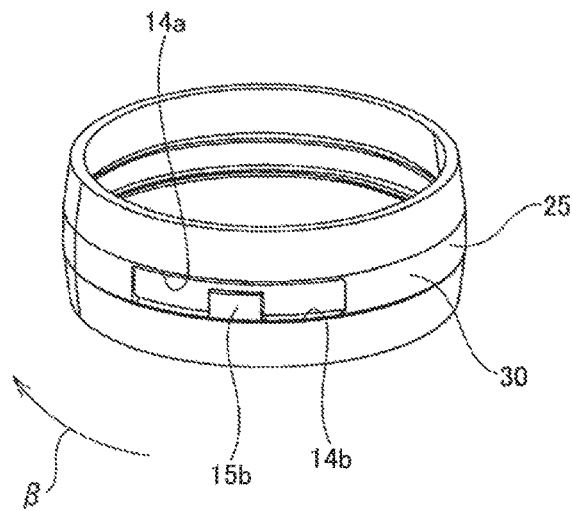
FIG. 3 is a view for describing an example of a punching process, and is a perspective view of a first ring-shaped workpiece in a state in which a portion is punched out.

In one example, as illustrated in FIGS. 1 to 3, a synchronizer ring 1a (1b) includes a tapered cylindrical portion (a tubular portion, a truncated-cone like tube) 13a (13b), and a plurality of claw pieces 15a (15b) (three in the present example).

The tapered cylindrical portion 13a (13b) includes a tubular portion (a tapered tubular portion (taper tube)) in which a diameter of an inner circumferential surface and/or an outer circumferential surface decreases toward one end edge in an axial direction, a conical tubular portion (cone tube), and a partial conical surface (partial cone surface). For example, both the inner circumferential surface and the outer circumferential surface of the tapered cylindrical portion 13a (13b) are inclined in a direction in which an inner diameter and an outer diameter become larger toward one side in the axial direction {upper side (lower side) of FIG. 1(G)(b)}.

Each of the claw pieces (tags) 15a (15b) is formed in a state of extending toward one side in the axial direction from a large diameter side end surface 14a (14b) (end surface in the axial direction, one end surface in the axial direction) of the tapered cylindrical portion 13a (13b). In the present example, three claw pieces 15a (15b) are disposed at regular intervals in the circumferential direction on the axial end surface 14a (14b). In another example, a plurality of claw pieces can be disposed at non-regular intervals in the circumferential direction. In another example, the number of claw pieces can be other than three. In the present example, each of the claw pieces 15a (15b) includes a first side and a second side extending at least in the axial direction from the axial end surface 14a, and a third side extending in the circumferential direction. The first side and the second side are disposed to be spaced apart in the circumferential direction. The third side connects an end of the first side and an end of the second side. Further, an angle (inclination angle) of each of the claw pieces 15a and 15a with respect to a ring axis can be appropriately determined.

Next, a method of manufacturing the synchronizer ring 1a by the method of manufacturing the ring-shaped member of the present example will be described.

In the method of manufacturing the ring-shaped member of the present example, first, a coil-shaped (or long rod-shaped) solid wire rod made of chromium steel such as SCr420, chromium molybdenum steel such as SCM420, high carbon chromium bearing steel such as SUJ2, or the like is cut into a desired length by an appropriate method such as pressing, saw cutting, laser cutting, or the like to obtain a columnar raw material (billet) 20 illustrated in FIG. 1(A). In another example, another material can be used.

Next, the raw material 20 is subjected to an upsetting process to form a columnar first workpiece 21 as illustrated in FIG. 1(B) having a smaller axial dimension and a larger radial dimension (diameter) than those of the raw material 20. The upsetting process is performed by forging.

Next, the first workpiece 21 is subjected to a backward extrusion process to form a second workpiece 22 having a bottomed cylindrical shape as illustrated in FIG. 1(C). The backward extrusion process also is performed by forging.

Next, by applying a punching process to the second workpiece 22, a bottom portion 23 of the second workpiece 22 is punched out to form a ring-shaped workpiece 24 as illustrated in FIG. 1(D). The ring-shaped workpiece 24 has a cylindrical shape in which an inner diameter and an outer diameter do not change in the axial direction.

Next, by applying a rolling process to the ring-shaped workpiece 24, inner and outer circumferential surfaces of the ring-shaped workpiece 24 are plastically deformed, by a pair of rollers (not illustrated), into a shape matching circumferential surfaces of both rollers, and thereby a first ring-shaped workpiece 25 as illustrated in FIG. 1(E) is formed. During such a rolling process, the outer diameter and inner diameter of the ring-shaped workpiece 24 increase, and a thickness of the ring-shaped workpiece 24 decreases.

In one example, an outer circumferential surface of the first ring-shaped workpiece 25 has a largest outer diameter at an axial center portion 29 and has a smaller outer diameter toward both end sides in the axial direction. On the other hand, an inner circumferential surface of the first ring-shaped workpiece 25 has a concave arcuate portion 26 formed at an axial intermediate portion including the axial center portion 29, and inclined curved surface portions 27 and 27 provided adjacent to both sides in the axial direction of the concave arcuate portion 26. Specifically, the concave arcuate portion 26 is formed to have a lamest inner diameter at a portion corresponding to the axial center portion 29 and to have a smaller inner diameter toward both end sides in the axial direction. The concave arcuate portion (concave surface) 26 continuously extending in the circumferential direction is formed on an inner circumferential surface of the axial center portion (axial intermediate portion) 29 of the first ring-shaped workpiece 25. That is, a step of forming the concave surface extending in the circumferential direction on the inner circumference of the intermediate portion 29 is performed before a punching step to be described below. In one example, the concave arcuate portion (concave surface) 26 can be formed in the circumferential direction over the entire inner circumference of the intermediate portion 29. In another example, the concave arcuate portion (concave surface) 26 can be formed in a portion of the inner circumference of the intermediate portion 29 in the circumferential direction. On the other hand, each of the inclined curved surface portions 27 and 27 is formed in an inclined curved surface shape in which an inner diameter on the axial center side (a side close to the concave arcuate portion 26) is the largest and the inner diameter decreases toward both end sides in the axial direction. Also, a thickness dimension of the first ring-shaped workpiece 25 in the radial direction is formed such that a thickness dimension of a portion corresponding to the concave arcuate portion 26 is smaller than a thickness dimension of portions corresponding to each of the inclined curved surface portions 27 and 27. The first ring-shaped workpiece 25 having such a configuration as described above has a symmetrical shape (symmetrical with respect to a virtual plane a which is perpendicular to the central axis of the first ring-shaped workpiece 25 and passing through the axial center portion 29) with respect to the axial direction {vertical direction in FIG. 1(E)(b)}.

Next, a central band-shaped portion 30 (the axial center portion 29, intermediate portion) corresponding to a portion in which the concave arcuate portion 26 is formed in the first ring-shaped workpiece 25 is subjected to a punching process to form a pair of ring-shaped members (a first ring-shaped member 28A and a second ring-shaped member 28B) as illustrated in FIGS. 1(F) and 2(B). In one example, the punching step includes a step of performing a first punching process on a first region of the central band-shaped portion 30 (the axial center portion 29, the intermediate portion) in the circumferential direction, and a step of performing a second punching process on a second region of the central band-shaped portion 30 which is at least partially different from the first region in the circumferential direction. The first punching process is performed such that at least one claw piece (15a, 15b) is formed. The second punching process is performed such that at least another one claw piece (15a, 15b) is formed. The first region includes a formation region for at least one claw piece (15a, 15b). The second region includes a formation region for at least one claw piece (15a, 15b). The second region in the circumferential direction can partially overlap the first region in the circumferential direction. A punching tool (for example, a punch) for the punching process can have a shape which corresponds to the three sides of the claw pieces (15a, 15b). A punching tool (for example, a punch) used in a first punching process can have substantially the same shape as a punching tool (for example, a punch) used in a second punching process. Alternatively, the punching tool (for example, a punch) used in the first punching process may have a different shape from the punching tool (for example, a punch) used in the second punching process. Alternatively, a punching tool (for example, a punch) used in the first punching process can also be used (re-used, shared) in the second punching process.

Specifically, for example, as illustrated in FIG. 3, a region of a span of approximately ⅙ (central angle of about 60°) of the entire circumference in the central band-shaped portion 30 is punched from a radially outward side to a radially inward side (or from the radially inward side to the radially outward side). Thereby one claw piece 15b is formed on (a portion corresponding to) one axial end surface of the second ring-shaped member 28B (see FIG. 2(B)). That is, in the above region, a portion that has not been punched out by the punching process remains as the claw piece 15b. Next, a region in which the central band-shaped portion 30 is punched out is shifted by ⅙ (central angle of about 60°) of the entire circumference of the first ring-shaped workpiece 25 from the above-described position to one side in the circumferential direction (for example, in a direction indicated by an arrow β in FIG. 3), and a region having the same span as that of the previous time is punched out at a position different from the previous time. Thereby, although not illustrated, the claw piece 15a is formed on (a portion corresponding to) one axial end surface of the first ring-shaped member 28A (see FIG. 2(B)). By repeating such punching work (in a case of the present example, by performing punching six times in total), the first ring-shaped member 28A having the claw pieces 15a and the second ring-shaped member 28B having the claw pieces 15b are formed. Specifically, the first ring-shaped member 28A in which three claw pieces 15a arranged at regular intervals (at 120° intervals in the case of the present example) in the circumferential direction are formed on the one axial end surface, and the second ring-shaped member 28B in which three claw pieces 15b arranged at regular intervals (at 120° intervals in the case of the present example) in the circumferential direction are formed on the one axial end surface are formed. In this manner, by punching out the central band-shaped portion 30 (the axial center portion 29, intermediate portion) of the first ring-shaped workpiece 25 over the entire circumference, the pair of ring-shaped members (the first ring-shaped member 28A and the second ring-shaped member 28B) are formed. In other words, a portion of the first ring-shaped workpiece 25 punched out by the above-described punching process is continuous over the entire circumference. By the step of punching out the axial intermediate portion of the ring-shaped workpiece 25 entirely in the circumferential direction such that a continuous blank is formed throughout in the circumferential direction, the first ring-shaped member 28A and the second ring-shaped member 28B each having at least one claw piece are formed. In the first ring-shaped workpiece 25, portions which have not been punched out in the punching process are a pair of ring-shaped members (the first ring-shaped member 28A and the second ring-shaped member 28B).

In one example, a manufacturing system for a ring-shaped member for a vehicle includes a punching device (first device) which punches out the axial intermediate portion of the ring-shaped workpiece 25 entirely in the circumferential direction so that the first ring-shaped member 28A and the second ring-shaped member 28B each having at least one claw piece are formed. Also, the manufacturing system includes a processing device (second device) which forms the concave surface extending in the circumferential direction on an inner circumference of the intermediate portion before the punching process of the punching device. The punching device performs a first punching process on the first region of the intermediate portion in the circumferential direction, and performs a second punching process on the second region of the intermediate portion which is at least partially different from the first region in the circumferential direction. The punching device can have a punching tool (for example, a punch) configured such that at least one claw piece is formed by a single punching operation with respect to the intermediate portion using the punching device. In one example, the punching tool used in the first punching process may have substantially the same shape as the punching tool used in the second punching process. Alternatively, the punching tool used in the first punching process can also be used in the second punching process.

The punching process as described above can be performed using, for example, an indexing device and a punch. Specifically, the first ring-shaped workpiece 25 supported by the indexing device is intermittently rotated at a predetermined angle (central angle of 60° of the first ring-shaped workpiece 25) with respect to a punch disposed at a radially outward side (or at a radially inward side) of the first ring-shaped workpiece 25. Then, in a state in which rotation by the indexing device is stopped, a portion of the central band-shaped portion 30 of the first ring-shaped workpiece 25 facing a distal end surface of the punch is punched out by the punch.

Further, when the punching process is performed in the steps from FIG. 1(E) to 1(F), a region punched by a single punching process can be made larger than that in the present example. For example, it is also possible to employ a configuration in which a region of about ⅓ (central angle of about 120°) of the entire circumference of the central band-shaped portion 30 is punched out from the radially outward side to the radially inward side (or from the radially inward side to the radially outward side) by a single punching process. In this case, one claw piece 15a is formed on the one ring-shaped member 28 and one claw piece 15b is formed on the other ring-shaped member 28 by the single punching process. Thereafter, by performing the punching operation three times in all by shifting the portion to be punched by 120°, it is possible to punch out the central band-shaped portion 30 over the entire circumference.

Also, it is also possible to employ a configuration in which a plurality of positions (for example, two positions spaced apart in the circumferential direction, each having a region of a central angle of 60°) spaced apart in the circumferential direction of the central band-shaped portion 30 of the first ring-shaped workpiece 25 are punched at the same time by a single punching process. In one example, in the first punching process on the first region of the intermediate portion in the circumferential direction, the first region can include a plurality of segmented regions spaced apart from each other in the circumferential direction. In addition, in the second punching process on the second region of the intermediate portion in the circumferential direction, the second region can include a plurality of segmented regions spaced apart from each other in the circumferential direction. The first device in the manufacturing system can include a plurality of punching tools (for example, punches) disposed to be spaced apart from each other in the circumferential direction. Such a punching process can be performed, for example, by a method called cam striking.

In the case of the present example, the ring-shaped members (the first ring-shaped member 28A and the second ring-shaped member 28B) correspond to the synchronizer rings (the synchronizer ring 1a and the synchronizer ring 1b). However, if necessary, it is also possible to form the synchronizer rings 1a and 1b by applying a finishing process such as sizing for adjusting shapes of the ring-shaped members 28A and 28B to the ring-shaped members 28A and 28B. Such sizing is performed, for example, by pressing an inner circumferential surface, an outer circumferential surface, and both axial end portions of both of the ring-shaped members 28A and 28B between an inner mold disposed at a radially inward side of both of the ring-shaped members 28A and 28B and an outer mold disposed in the same manner at a radially outward side thereof. Also, if necessary, a finish process by machining such as turning can also be applied. Further, after such finishing process by sizing or machining as described above, a heat treatment for imparting desired mechanical properties (such as hardness) is applied to both of the ring-shaped members 28A and 28B. In the heat treatment, for example, a carburizing heat treatment and through quenching is performed, and thereafter, deformation due to the heat treatment is corrected.

According to the method of manufacturing the ring-shaped member of the present example as described above, it is possible to improve manufacturing efficiency. That is, in the case of the method of manufacturing the ring-shaped member of the present example, the pair of ring-shaped members 28A and 28B (synchronizer ring 1a and 1b) can be formed from the first ring-shaped workpiece 25 made by applying a rolling process on the ring-shaped workpiece 24. Therefore, manufacturing efficiency can be improved compared to the manufacturing method in which one ring-shaped member is formed from one ring-shaped workpiece.

In the case of the method of manufacturing the ring-shaped member of the present example, the ring-shaped workpiece 24 is manufactured by forging having the processes as described above. That is, in the case of the method of manufacturing the ring-shaped member of the present example, an unused portion of metal materials is only a portion corresponding to the bottom portion 23 of the second workpiece 22 which is punched out in the punching steps illustrated in FIGS. 1(C) and 1(D). This portion is less than an unused portion of a flat plate in a case in which a flat metal plate is subjected to a punching process to form a member of the same shape as the ring-shaped workpiece 24. Therefore, according to the manufacturing method of the present example, it is possible to reduce manufacturing cost by improving yield of metal materials. Further, since the metal wire rod used in the method of manufacturing the ring-shaped member of the present example is less expensive than a metal plate, manufacturing cost can be reduced.

Also, in the case of the present example, when the central band-shaped portion 30 of the first ring-shaped workpiece 25 is punched, the claw piece 15a of one ring-shaped member 28A and the claw piece 15b of the other ring-shaped members 28B can be formed by the non-punched portion of the central band-shaped portion 30. Therefore, it is possible to reduce an amount of the unused portion (a portion which does not correspond to the claw piece 15a of one ring-shaped member 28A and the claw piece 15b of the other ring-shaped member 28B) in the central band-shaped portion 30. As a result, yield of the metal materials can be improved and manufacturing cost can be reduced.

Also, it is difficult to form a thin and large diameter member such as the first ring-shaped workpiece 25 by a forging process, but it can be relatively easily formed when the rolling process as described above is used. As a result, it is possible to reduce processing costs, and further it is possible to reduce manufacturing costs. Particularly, in the case of the present example, a shape of the first ring-shaped workpiece 25 is symmetrical with respect to the axial direction. Since such a shape facilitates a stable rolling process, it is possible to reduce processing costs, and further it is possible to reduce manufacturing costs.

Second Example of the Embodiment

Figure 4:
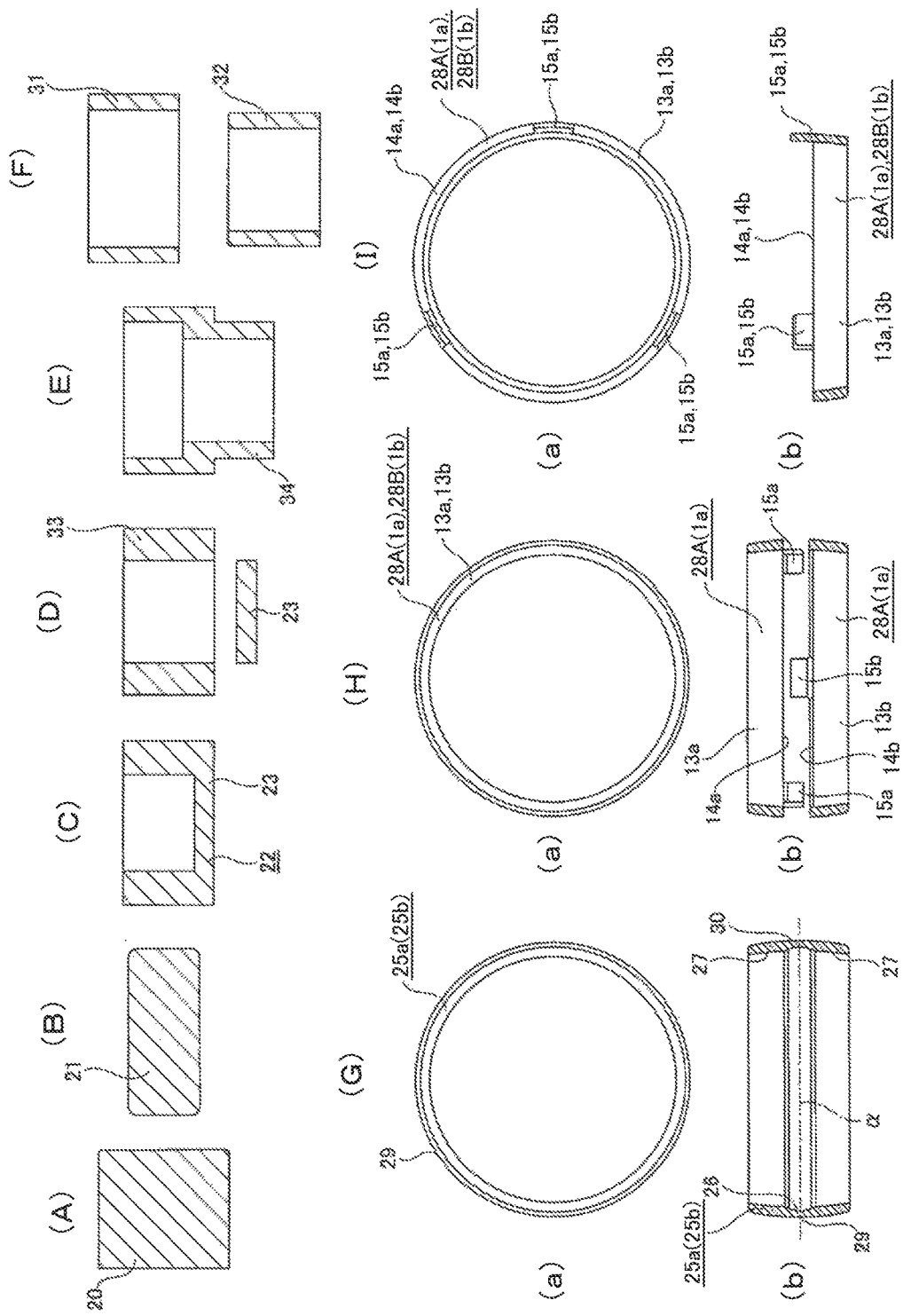
FIG. 4 is a view similar to FIG. 1 illustrating a second example of the embodiment of the present invention.

A second example of the embodiment of the present invention will be described with reference to FIG. 4. In a method of manufacturing the ring-shaped member of the present example, steps of forming a ring-shaped large-diameter workpiece 31 corresponding to the ring-shaped workpiece and a member corresponding to a ring-shaped small-diameter workpiece 32 are different from the case of the above-described first example of the embodiment.

In the method of manufacturing the ring-shaped member of the present example, first, as in the first example of the embodiment described above, a coil-shaped (or long rod-shaped) wire rod made of chromium steel such as SCr420, chromium molybdenum steel such as SCM420, or high carbon chromium bearing steel such as SUJ 2 is cut into a desired length by an appropriate method such as pressing, saw cutting, laser cutting, or the like to obtain a columnar raw material (billet) 20 illustrated in FIG. 4(A). In another example, another materials can be used.

Next, the raw material 20 is subjected to an upsetting process to form a columnar first workpiece 21 as illustrated in FIG. 4(B) having a smaller axial dimension and a larger radial dimension (diameter) than the raw material 20. The upsetting process is performed by forging. As forging, various methods such as cold forging, hot forging, or warm forging can be employed, for example.

Next, a first workpiece 21 is subjected to a backward extrusion process to form a second workpiece 22 having a bottomed cylindrical shape as illustrated in FIG. 4(C). The backward extrusion process is performed by forging.

Next, by applying a punching process to the second workpiece 22, a bottom portion 23 of the second workpiece 22 is punched out to form a third workpiece 33 as illustrated in FIG. 4(D). Such a third workpiece 33 has a cylindrical shape in which an inner diameter and an outer diameter do not change in the axial direction. The third workpiece 33 corresponds to the ring-shaped workpiece 24 of the first example of the above-described embodiment. Steps so far are the same as those in the first example of the above-described embodiment.

Particularly, in the case of the method of manufacturing the ring-shaped member of the present example, the third workpiece 33 is subjected to a forward extrusion process to form a fourth workpiece 34 having a stepped cylindrical shape on both inner and outer circumferential surfaces as illustrated in FIG. 4(E).

Next, the fourth workpiece 34 is subjected to a punching process to be separated into the ring-shaped large-diameter workpiece 31 and the ring-shaped small-diameter workpiece 32 as illustrated in FIG. 4(F). Both of the ring-shaped large-diameter workpiece 31 and the ring-shaped small-diameter workpiece 32 are cylindrical members whose inner and outer diameters are not changed with respect to the axial direction. The inner diameter of the ring-shaped small-diameter workpiece 32 is smaller than the inner diameter of the ring-shaped large-diameter workpiece 31. The outer diameter of the ring-shaped small-diameter workpiece 32 is smaller than the outer diameter of the ring-shaped large-diameter workpiece 31. On the other hand, a volume of the ring-shaped large-diameter workpiece 31 and a volume of the ring-shaped small-diameter workpiece 32 are equal to each other. In the case of the present example, both the ring-shaped large-diameter workpiece 31 and the ring-shaped small-diameter workpiece 32 correspond to the ring-shaped workpiece.

Then, first, by applying a rolling process to the ring-shaped large-diameter workpiece 31, inner and outer circumferential surfaces of the ring-shaped large-diameter workpiece 31 are plastically deformed, by a pair of rollers (not shown), into a shape matching circumferential surfaces of both rollers, and thereby a first ring-shaped workpiece 25a as illustrated in FIG. 4(G) is formed. The first ring-shaped workpiece 25a has substantially the same structure as the first ring-shaped workpiece 25 of the above-described first example of the embodiment.

On the other hand, by applying the rolling process also to the ring-shaped small-diameter workpiece 32, a first ring-shaped workpiece 25b as illustrated in FIG. 4(G) is formed. That is, in the case of the present example, the first ring-shaped workpieces 25a and 25b having the same shape are formed by applying the rolling process to the ring-shaped large-diameter workpiece 31 and the ring-shaped small-diameter workpiece 32.

Further, a step of obtaining the pair of ring-shaped members 28A and 28B from each of the first ring-shaped workpieces 25a and 25b by applying the punching process to an axial center portion 29 of the first ring-shaped workpieces 25a and 25b is the same as in the case of the above-described first example of the embodiment.

In the case of the present example as described above, since it is possible to form four ring-shaped members 28A, 28A, 28B, and 28B from the raw material 20, when the ring-shaped large-diameter workpiece 31 and the ring-shaped small-diameter workpiece 32 are formed, an unused portion of the metal materials is only a portion corresponding to the bottom portion 23 of the second workpiece 22 punched out in the steps from FIG. 4(C) to FIG. 4(D). In the case of the present example as described above, it is possible to further improve manufacturing efficiency of the ring-shaped member and to further improve yield of metal materials, thereby manufacturing costs can be reduced. Other configurations, operations and effects are similar to those in the above-described first example of the embodiment.

Figure 5:
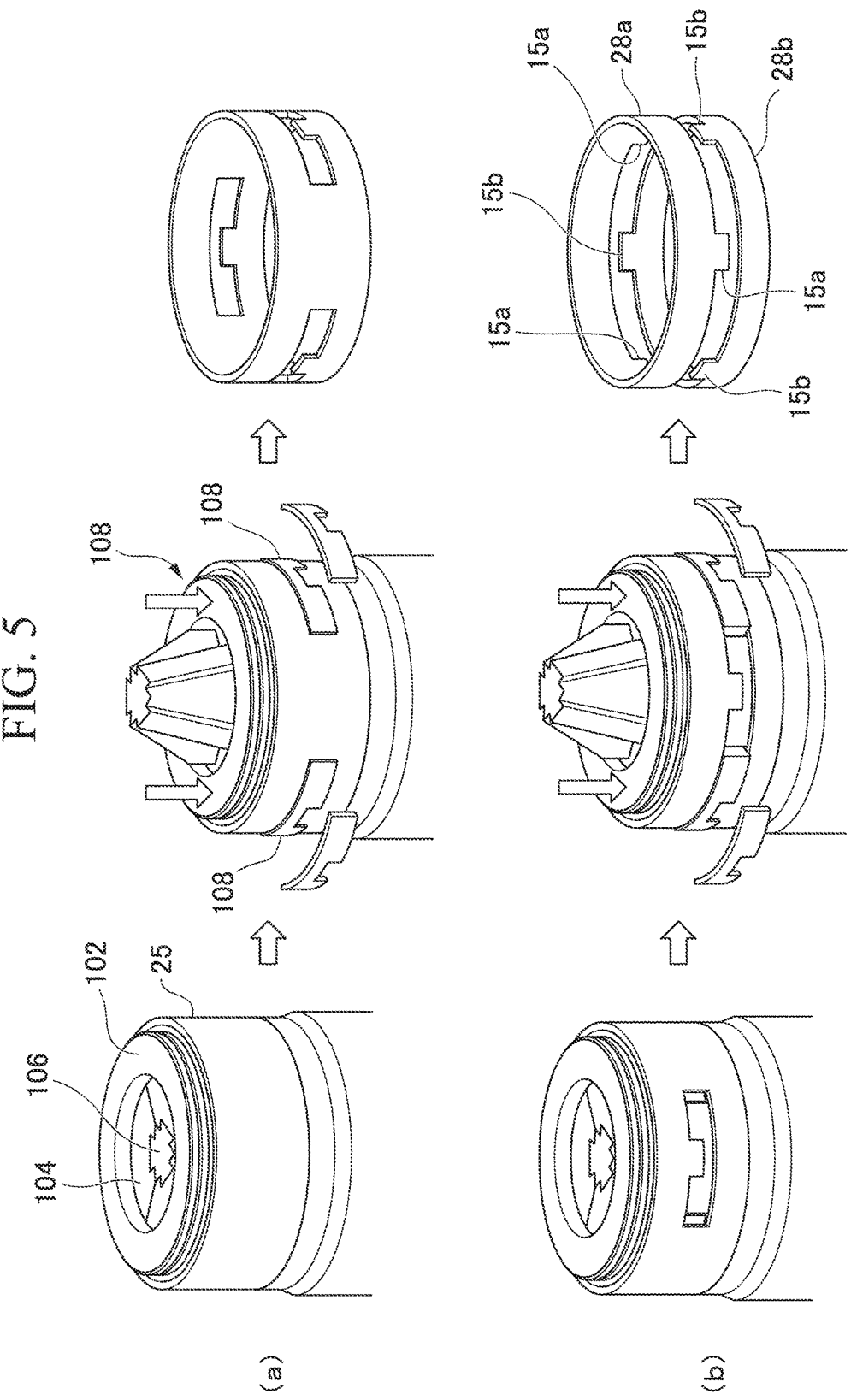
FIG. 5 is a view illustrating an example of a punching device.
Figure 6:
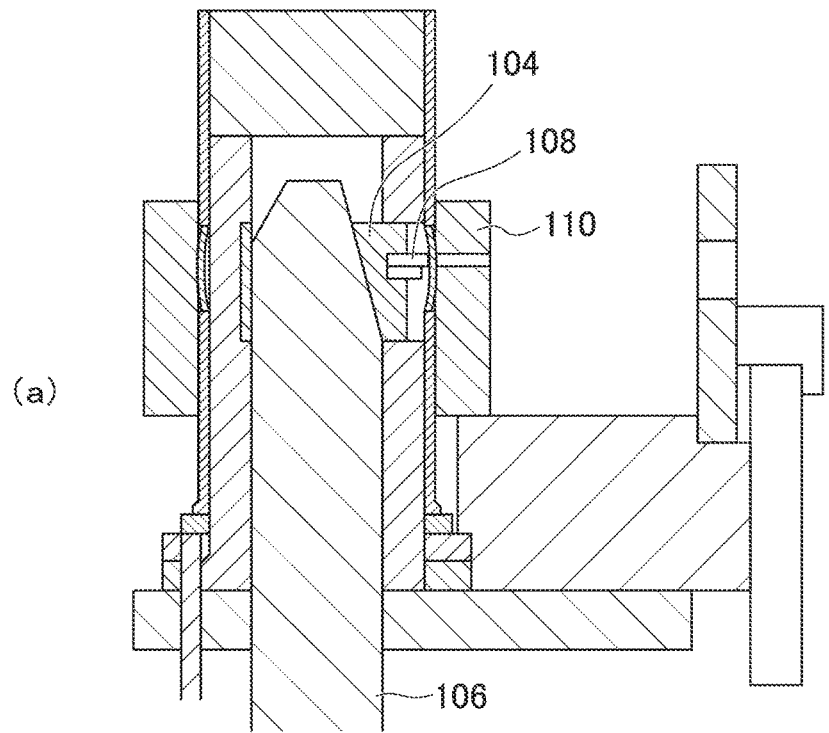
FIG. 6 is a view illustrating an example of a punching device.
Figure 6:
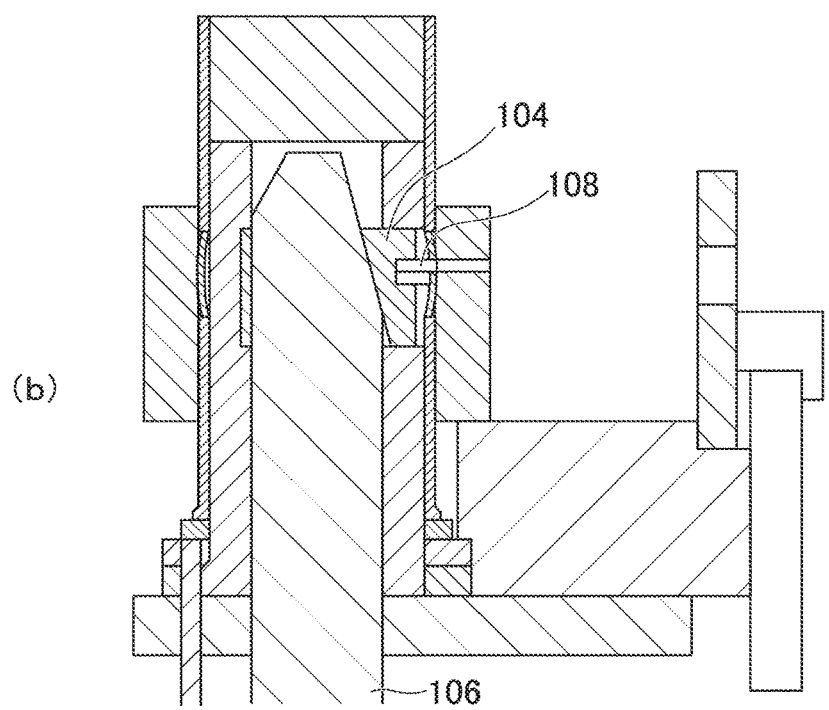

FIGS. 5 and 6 are views illustrating an example of a punching device (first device) in a manufacturing system for a ring-shaped member for a vehicle. As illustrated in FIG. 5, a punching device 100 is configured to punch out an axial intermediate portion of the ring-shaped workpiece (workpiece) 25 entirely in the circumferential direction so that the first ring-shaped member 28A and the second ring-shaped member 28B each having at least one claw piece (15a, 15b) are formed. In the examples of FIGS. 5 and 6, the punching device 100 includes a punch case 102, a cam slider 104, a mandrel 106, a punch 108, and a die 110. In one example, the punching device 100 includes three punches 108 arranged to be spaced apart from each other in the circumferential direction. In another example, the number of punches 108 can be other than three. One circumferential center of the punch 108 and another circumferential center thereof can have an angular interval (angular spacing) of 90° or more and less than 270°. This is advantageous, for example, for simultaneous punching operation using a plurality of punches by vector dispersion or the like. In one example, the three punches 108 are disposed at substantially equal pitch in the circumferential direction. A positional relationship of the three punches 108 has equiangular intervals (120° intervals). In another example, the plurality of punches can be disposed at non-regular intervals in the circumferential direction. In one example, the three punches 108 have substantially the same shape as each other. Each of the punches 108 can have a shape corresponding to three sides of the claw piece (15a, 15b) described above. In another example, the three punches 108 can have different shapes from each other.

As illustrated in FIG. 5(*a*), the punching device 100 performs a first punching process on a first region of the axial intermediate portion of the workpiece (the ring-shaped workpiece 25) in the circumferential direction. As illustrated in FIGS. 5 and 6, in the first punching process, the cam slider 104, the punch 108, and the workpiece move in the axial direction with respect to the mandrel 106. An axial movement is converted in the radial direction by the cam slider 104 or the like. The three punches 108 arranged inside the workpiece simultaneously move outward in the radial direction. Three portions of the axial intermediate portion of the workpiece are simultaneously punched out by the three punches 108. Three blanks corresponding to a shape of the punch 108 are simultaneously formed in the workpiece and three claw pieces are formed as remainder portions. Simultaneous formation of the plurality of blanks is advantageous for improving positional accuracy of the claw pieces. In another example, the mandrel 106 can move in the axial direction with respect to the cam slider 104, the punch 108, and the workpiece.

Next, as illustrated in FIG. 5(*b*), the punching device 100 performs a second punching process on a second region of the axial intermediate portion of the workpiece (the ring-shaped workpiece 25) in the circumferential direction. In the second punching process, the workpiece is set such that the workpiece is inverted upside down with respect to the first punching process and shifted in the circumferential direction (for example, shifted by 60°). In one example, the three punches 108 used in the first punching process are also used in the second punching process. Excepting the setting of the workpiece, the second punching process can be performed in the same manner as the first punching process. Also, the second punching process is performed so that the plurality of blanks formed by the first punching process are connected to each other and a blank (gap) which is continuous throughout in the circumferential direction is formed. As a result, the axial intermediate portion of the workpiece is punched entirely in the circumferential direction and another three claw pieces are formed as remainder portions. Since a continuous blank (gap) is formed over the entire circumferential direction, the workpiece is separated into two pieces. Two ring-shaped members (the first ring-shaped member 28A and the second ring-shaped member 28B) each having three claw pieces (15a, 15b) are formed.

Figure 7:
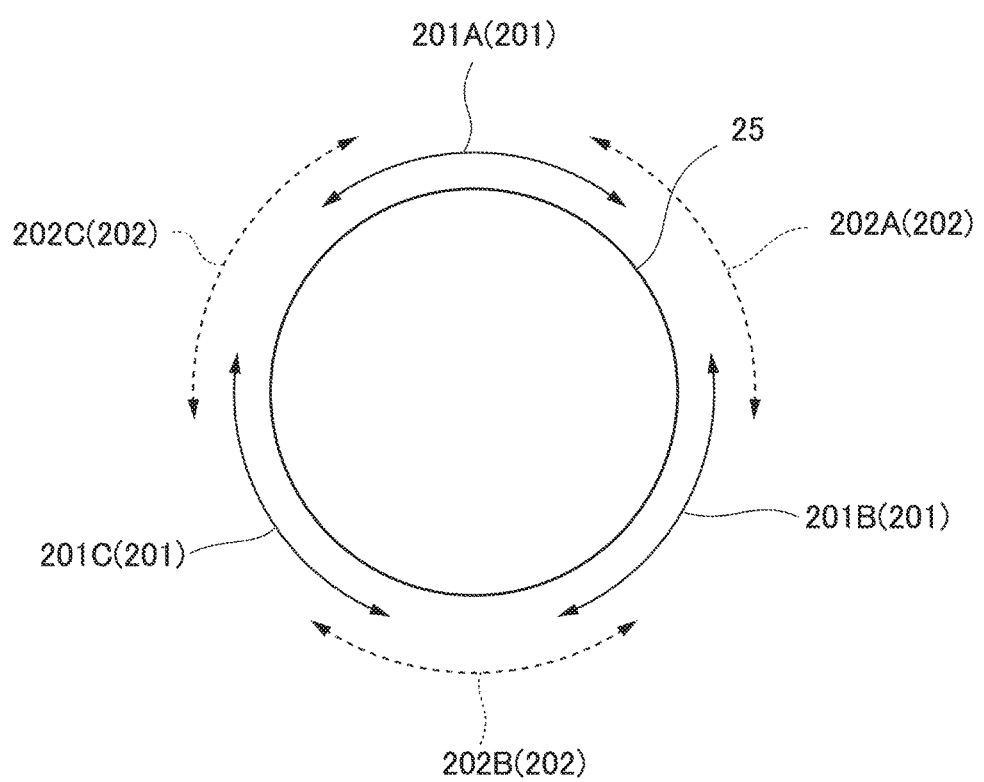
FIG. 7 is a view schematically illustrating an example of punching regions.

FIG. 7 is a view schematically illustrating an example of punching regions. A punching region (a first region 201) in the first punching process includes a plurality of segmented regions 201A, 201B, and 201C which are spaced apart from each other in the circumferential direction. A punching region (a second region 202) in the second punching process includes a plurality of segmented regions 202A, 202B, and 202C which are spaced apart from each other in the circumferential direction. In the example of FIG. 7, the second region 202 is shifted by 60° in the circumferential direction with respect to the first region 201. Also, in the example of FIG. 7, the second region 202 in the circumferential direction partially overlaps the first region 201 in the circumferential direction. In a plurality of punching steps, a sum of a circumferential length of punching in each step is larger than the circumferential length of the workpiece. In one example, one end portion of the punching region (for example, the segmented region 201A) in one punching step overlaps a punching region (for example, the segmented region 202A) in another punching step, and the other end portion of the punching region (for example, the segmented region 201A) in the one punching step overlaps a punching region (for example, the segmented region 202C) in another punching step. That is, both ends of a punching region in a certain step overlap two punching regions in another punching step (one or two steps). Due to the overlapping of the punching regions, continuous blanks are reliably formed.

In each example of the above-described embodiment, one cut out from a solid wire rod is used as the raw material. However, as the raw material, it is also possible to employ one cut out from a hollow wire rod. Even when the raw material obtained by cutting out such a hollow wire rod is used, it is possible to obtain an effect on the yield of the metal materials as in each example of the above-described embodiment.

In addition to the synchronizer ring, the present invention can be applied to various ring-shaped members for a vehicle having claw pieces on an end surface in the axial direction.

Further, an inclination angle of the claw piece included in the ring-shaped member which is an object of the present invention is not limited to the structure of each example of the above-described embodiment. Also, the ring-shaped member which is an object of the present invention may be a finished product or an intermediate member (intermediate part) in a step of manufacturing the finished product.

In one embodiment, a method of manufacturing a ring-shaped member for a vehicle includes a punching step of punching out an axial intermediate portion (29) of a ring-shaped workpiece (25) so that a first ring-shaped member (25A) and a second ring-shaped member (25B) each having at least one claw piece (15a, 15b) are formed, in which the punching step includes a step of performing a first punching process on a first region of the intermediate portion (29) in a circumferential direction, and a step of performing a second punching process on a second region of the intermediate portion (29) which is at least partially different from the first region in the circumferential direction, and the method further includes a step of forming a concave surface (26) extending in the circumferential direction on an inner circumference of the intermediate portion (29) before the punching process. For example, the concave surface (26) can contribute to processability of the punching process. In one example, the intermediate portion (29) can be punched out entirely in the circumferential direction. In another example, after punching out the intermediate portion (29) leaving a portion in the circumferential direction, the remainder portion can be cut by a process other than the punching process. In one example, the concave arcuate portion (concave surface) 26 can be formed in the circumferential direction over the entire inner circumference of the intermediate portion (29). In another example, the concave surface (26) can be formed in a portion of the inner circumference of the intermediate portion (29) in the circumferential direction.

In one embodiment, in a method of manufacturing a ring-shaped member for a vehicle including cylindrical portion (13a, 13b) and a claw piece (15a, 15b) formed on an end surface in an axial direction of the cylindrical portion in a state of protruding in the axial direction from the end surface in the axial direction, the method includes a step of forming a pair of ring-shaped members (28A and 28B) in which at least one claw piece (15a, 15b) protruding in the axial direction from the end surface is provided on the end surface of each punched side by applying a punching process for punching out the entire circumference of an axial intermediate portion (29) with respect to a first ring-shaped workpiece (25).

In the above-described embodiment, the punching process can be performed while index-rotating the first ring-shaped workpiece (25) and the punch relatively.

In the above-described embodiment, it is possible to have a step of forming the first ring-shaped workpiece (25) by applying a rolling process for reducing a thickness of a ring-shaped workpiece with respect to the ring-shaped workpiece (24). In one example, the ring-shaped workpiece (24) can be formed by forging a material cut out from a solid wire rod.

In the above-described embodiment, an inner circumferential surface and an outer circumferential surface of the first ring-shaped workpiece (25) can be inclined in a direction in which an outer diameter and an inner diameter become larger toward the axial center portion. In one example, a ring-shaped large-diameter workpiece (31) and a ring-shaped small-diameter workpiece (32) having outer and inner diameter dimensions different from each other are formed by forging the workpiece, and each of the ring-shaped large-diameter workpiece and the ring-shaped small-diameter workpiece can be the ring-shaped workpiece. In one example, the ring-shaped large-diameter workpiece (31) and the ring-shaped small-diameter workpiece (32) can have the same volume.

In the above-described embodiment, a first ring-shaped workpiece (25a) formed by applying a rolling process to a ring-shaped workpiece formed from the ring-shaped large-diameter workpiece (31) and a first ring-shaped workpiece (25b) formed by applying a rolling process to a ring-shaped workpiece formed from the ring-shaped small-diameter workpiece (32) can have the same dimension.

In the above-described embodiment, one cut out from a hollow wire rod can be the ring-shaped workpiece.

EXPLANATION OF NUMERALS AND CHARACTERS 1, 1a, 1b Synchronizer ring
2 Drive shaft
3 Synchronizing hub
4 Insert spring
5 Coupling sleeve
6 Transmission gear
7 Clutch gear
8 Outer balk ring
9 Inner balk ring
10 Spline groove
11 Spline groove
12 Spline groove
13, 13a, 13b Tapered cylindrical portion
14, 14a, 14b Large diameter side end surface
15, 15a, 15b Claw piece
16 First ring-shaped workpiece
17 Main body portion
18 Tongue-shaped portion
19 Second ring-shaped workpiece
19 Tapered cylindrical portion
20 Raw material
21 First workpiece
22 Second workpiece
23 Bottom portion
24 Ring-shaped workpiece
25, 25a, 25b First ring-shaped workpiece
26 Concave arcuate portion
27 Inclined curved surface portion
28, 28A, 28B Ring-shaped member
29 Axial center portion
30 Central band-shaped portion
31 Ring-shaped large-diameter workpiece
32 Ring-shaped small-diameter workpiece
33 Third workpiece
34 Fourth workpiece
100 Punching device
108 Punch (Punching tool)
201 First region
201A, 201B, 201C Segmented region
202 Second region
202A, 202B, 202C Segmented region

The invention claimed is:

1. A method of manufacturing a ring-shaped member for a vehicle, the method comprising:
punching out an axial intermediate portion of a ring-shaped workpiece entirely in a circumferential direction so that a first ring-shaped member and a second ring-shaped member each having at least one claw piece are formed, wherein
the punching step comprises:
performing a first punching process on a first region of the intermediate portion in the circumferential direction; and
performing a second punching process on a second region of the intermediate portion which is at least partially different from the first region in the circumferential direction.

2. The method of manufacturing a ring-shaped member for a vehicle according to claim 1, wherein:
the first punching process is performed so that at least one claw piece is formed; and
the second punching process is performed so that at least another one claw piece is formed.

3. The method of manufacturing a ring-shaped member for a vehicle according to claim 1, wherein:
the first punching process comprises punching out the intermediate portion simultaneously at a plurality of segmented areas of the first region by using a plurality of punching tools, wherein the plurality of segmented areas are spaced apart from each other in the circumferential direction, and
the second punching process comprises punching out the intermediate portion simultaneously at another plurality of segmented areas of the second region by using the plurality of punching tools, wherein the another plurality of segmented areas are spaced apart from each other in the circumferential direction.

4. The method of manufacturing a ring-shaped member for a vehicle according to claim 1, wherein a punching tool used in the first punching process has substantially the same shape as a punching tool used in the second punching process.

5. The method of manufacturing a ring-shaped member for a vehicle according to claim 1, further comprising forming a concave surface extending in the circumferential direction on an inner circumference of the intermediate portion before the punching step.

6. The method of manufacturing a ring-shaped member for a vehicle according to claim 1, wherein the ring-shaped member is a synchronizer ring.

7. The method of manufacturing a ring-shaped member for a vehicle according to claim 1, further comprising:
preparing a first punching tool and a second punching tool that are spaced apart from each other in the circumferential direction such that an angular interval between a circumferential center of the first punching tool and a circumferential center of the second punching tool is 90° or more and less than 270°, wherein both the first punching tool and the second punching tool are used in each of the first punching process and the second punching process.

8. A system of manufacturing a ring-shaped member for a vehicle, the system comprising:
a first device configured to punch out an axial intermediate portion of a ring-shaped workpiece entirely in a circumferential direction so that a first ring-shaped member and a second ring-shaped member, each having a tubular portion and at least one claw piece, are formed, wherein:
the first device has a punching tool that is arranged movably in a radial direction of the tubular portion to punch out the ring-shaped workpiece,
a distal end surface of the punching tool has two first areas and one second area, each of the two first areas having a relatively large width in an axial direction of the tubular portion and extending in the circumferential direction, the second area having a relatively small width in the axial direction and extending in the circumferential direction,
the second area of the punching tool is arranged between the two first areas of the punching tool, in the circumferential direction,
the second area has a circumferential length that corresponds to the at least one claw piece, and
wherein the first device is configured to:
perform a first punching process on a first region of the intermediate portion in the circumferential direction; and
perform a second punching process on a second region of the intermediate portion which is at least partially different from the first region in the circumferential direction.

9. The system of manufacturing a ring-shaped member for a vehicle according to claim 8, wherein:
the punching tool is configured to form the at least one claw piece by a single punching operation with respect to the intermediate portion.

10. The system of manufacturing a ring-shaped member for a vehicle according to claim 9, wherein the punching tool has a first punch and a second punch that are spaced apart from each other in the circumferential direction and each are arranged movably in the radial direction to punch out the ring-shaped workpiece, each of the first punch and the second punch having the distal end surface that has the two first areas and the one second area.

11. The system of manufacturing a ring-shaped member for a vehicle according to claim 8, wherein the distal end surface of the punching tool is arranged in the first region in the first punching process, wherein the distal end surface of the punching tool is arranged in the second region in the second punching process.

12. The system of manufacturing a ring-shaped member for a vehicle according to claim 10, wherein an angular interval between a circumferential center of the first punch and a circumferential center of the second punch is 90° or more and less than 270°.

13. The system of manufacturing a ring-shaped member for a vehicle according to claim 8, wherein the ring-shaped member is a synchronizer ring.

\* \* \* \* \*